(12) United States Patent
Achmad

(10) Patent No.: US 6,343,676 B1
(45) Date of Patent: Feb. 5, 2002

(54) SHOCK ABSORBER MOUNTED REAL TIME DAMPER VALVE

(75) Inventor: Muchlis Achmad, Santa Clarita, CA (US)

(73) Assignee: HR Textron, Inc., Valencia, CA (US)

( * ) Notice: Subject to any disclaimer, the term of this patent is extended or adjusted under 35 U.S.C. 154(b) by 0 days.

(21) Appl. No.: 09/490,786

(22) Filed: Jan. 24, 2000

(51) Int. Cl.[7] .................................................. F16F 9/34
(52) U.S. Cl. ................. 188/299.1; 188/266.5; 188/319.1; 188/322.15; 188/322.22
(58) Field of Search ............................ 188/266.5, 319.1, 188/322.15, 322.22, 299.1

(56) References Cited

U.S. PATENT DOCUMENTS

| | | |
|---|---|---|
| 4,638,896 A | 1/1987 | Poyser |
| 4,723,640 A | 2/1988 | Beck |
| 4,785,920 A | 11/1988 | Knecht et al. |
| 4,854,429 A | 8/1989 | Casey |
| 5,078,240 A * | 1/1992 | Ackermann et al. ........ 188/285 |
| 5,085,299 A * | 2/1992 | Spiess et al. .............. 188/319 |
| 5,265,703 A * | 11/1993 | Ackermann ................. 188/299 |
| 5,285,878 A * | 2/1994 | Scheffel et al. ............. 188/319 |
| 5,303,804 A * | 4/1994 | Spiess ....................... 188/319 |
| 5,409,088 A * | 4/1995 | Sonsterod .................. 188/299 |
| 5,409,089 A * | 4/1995 | Rapp et al. ................ 188/299 |
| 5,559,700 A | 9/1996 | Majeed et al. |
| 5,833,037 A * | 11/1998 | Preukschat ................ 188/299.1 |
| 5,950,775 A * | 9/1999 | Achmad ................... 188/282.2 |
| 6,000,508 A * | 12/1999 | Forster ..................... 188/299.1 |
| 6,003,644 A * | 12/1999 | Tanaka ..................... 188/266.5 |
| 6,035,979 A * | 3/2000 | Forster ..................... 188/266.6 |
| 6,152,271 A * | 11/2000 | Achmad ................... 188/266.5 |

* cited by examiner

Primary Examiner—Robert J. Oberleitner
Assistant Examiner—Benjamin A Pezzlo
(74) Attorney, Agent, or Firm—Fulbright & Jaworski L.L.P.

(57) ABSTRACT

A shock absorber mounted electromagnetically operated real time damper valve which is mounted upon a piston rod and provides a flow path for fluid which bypasses the piston which separates a cylinder of the shock absorber into a pair of fluid containing chambers. The damper valve includes a spool reciprocally mounted within the hollow interior of a housing. A treatably secured cap is used to retain all of the component parts of the valve assembled without the need for other securing devices such as adhesives or brazing of parts together.

2 Claims, 7 Drawing Sheets

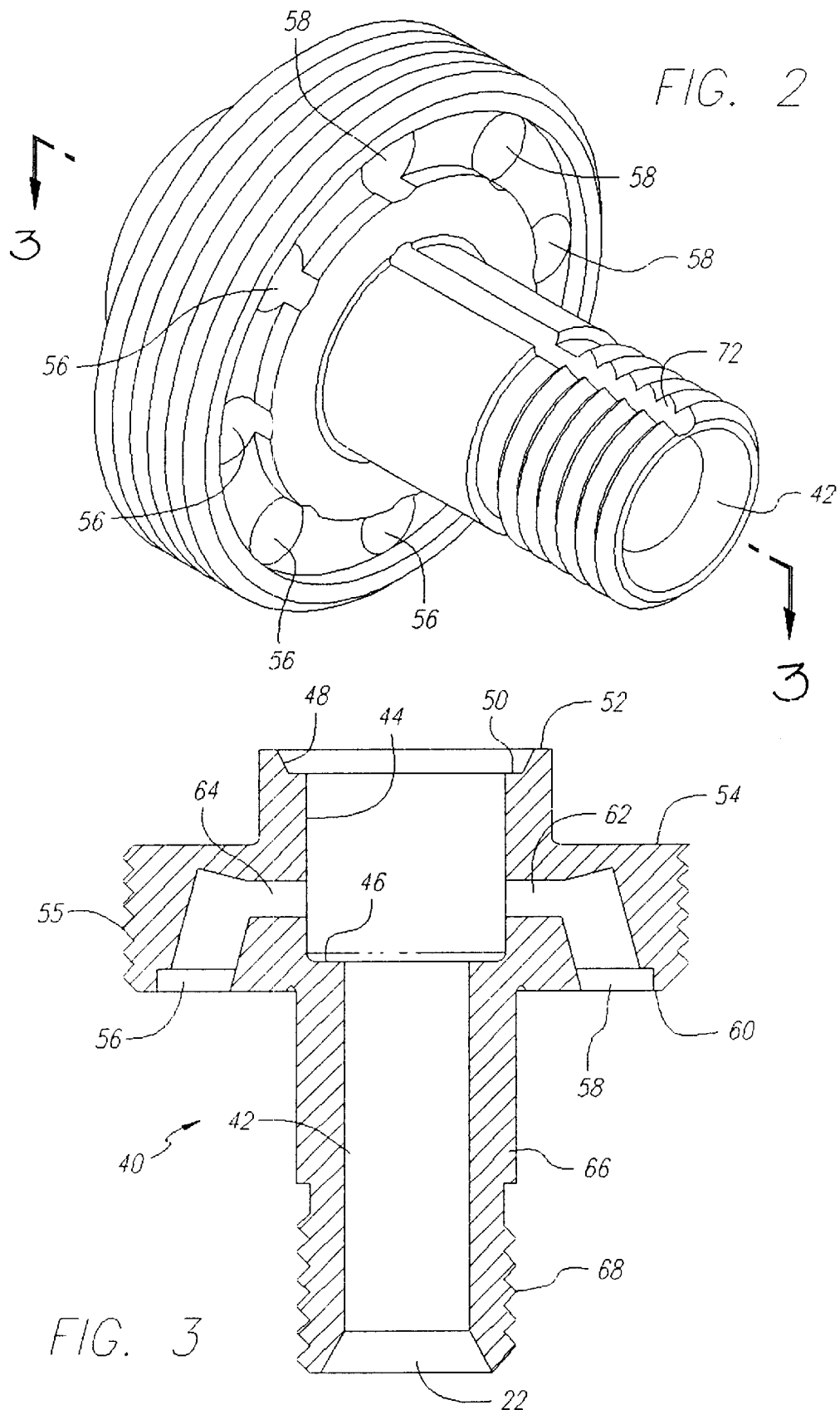

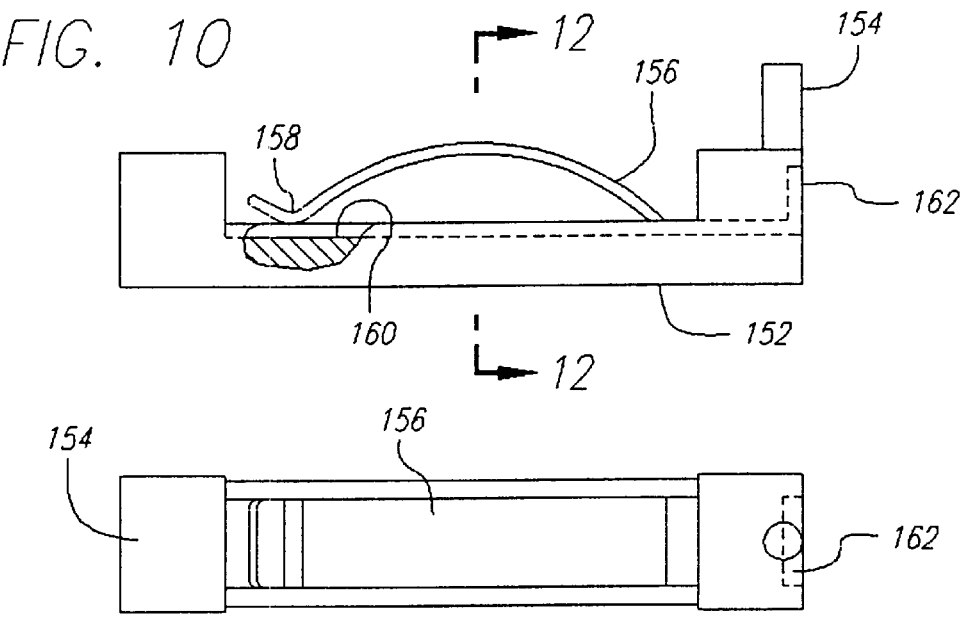
FIG. 10
FIG. 11
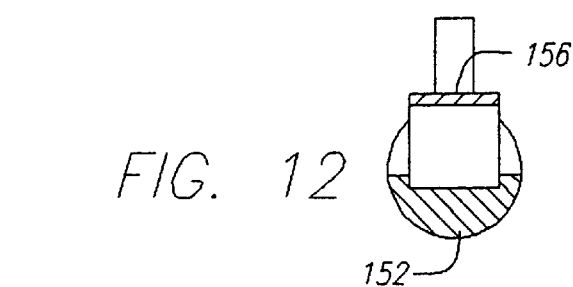
FIG. 12
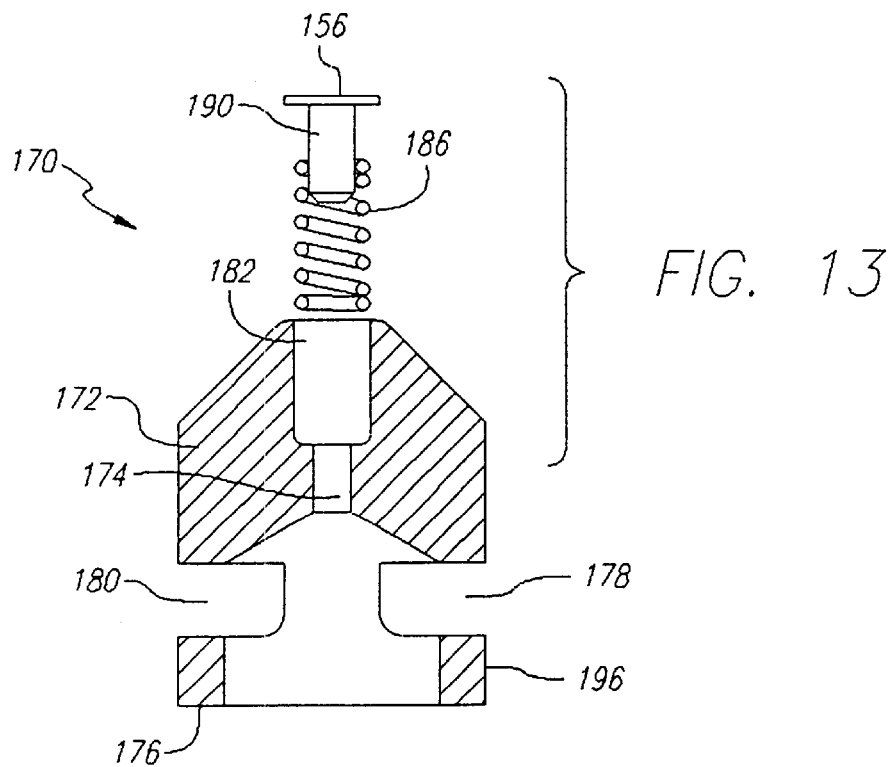
FIG. 13

SHOCK ABSORBER MOUNTED REAL TIME DAMPER VALVE

BACKGROUND OF THE INVENTION

The present invention relates to shock absorbers for use in automotive vehicles and more particularly to vibration dampers of the type which are mounted upon the shock absorber and are electromagnetically actuated to damp vibrations.

Such shock absorbers are traditionally constructed by having a damping piston which is fastened to a piston rod which divides the work cylinder into two chamber halves filled with a hydraulic damping fluid. The piston typically incorporates valves for restricting the flow of fluid therethrough as the piston moves along the cylinder. The valves are designed to provide a greater resistance in one direction of the piston movement than the other. These valves are usually preset during manufacture and the setting of these valves is not suitable for all vehicle load conditions generated by surfaces over which the vehicle may be driven and/or the speeds at which the vehicle may be driven.

To accommodate varying loads, road surfaces, driving conditions and the like, shock absorbers have been produced with adjustable piston valves and/or with additional controlled valves as a part thereof. These valves for the most part have been adjustable externally of the shock absorber either manually or electromechanically. In some instances, electromagnetically operated damping valves have been included to accommodate this additional adjustable feature. Typical of such, prior art adjustable hydraulic vibration dampers included within shock absorbers are the devices disclosed in U.S. Pat. Nos. 4,638,896; 5,559,700; 5,409,089; 4,723,640; 4,785,920; 4,854,429.

SUMMARY OF THE INVENTION

A shock absorber mounted real time damper valve for regulating the flow of fluid through the shock absorber to accommodate varying road conditions which damper valve includes a housing defining a plurality of openings. A spool means is reciprocally mounted within a hollow interior of the housing and is moveable between first and second positions responsive to electromagnetic energization thereof. A jacket is threadably secured to the housing and is the only means for securing the real time damper valve components together.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 2 is a perspective view of a housing of the valve of the present invention;

FIG. 3 is a cross-sectional view of the housing taken about the lines 3—3 of FIG. 2;

FIG. 10 is a side view partially in cross-section showing a contact assembly of the valve of the present invention;

FIG. 11 is a top view thereof,

FIG. 12 is a cross-sectional view taken about the lines 12—12 of FIG. 10 thereof;

FIG. 13 is a partial cross-sectional view of a spool assembly used as a part of the valve of the present invention;

DETAILED DESCRIPTION OF PREFERRED EMBODIMENT OF THE INVENTION

Figure 1:
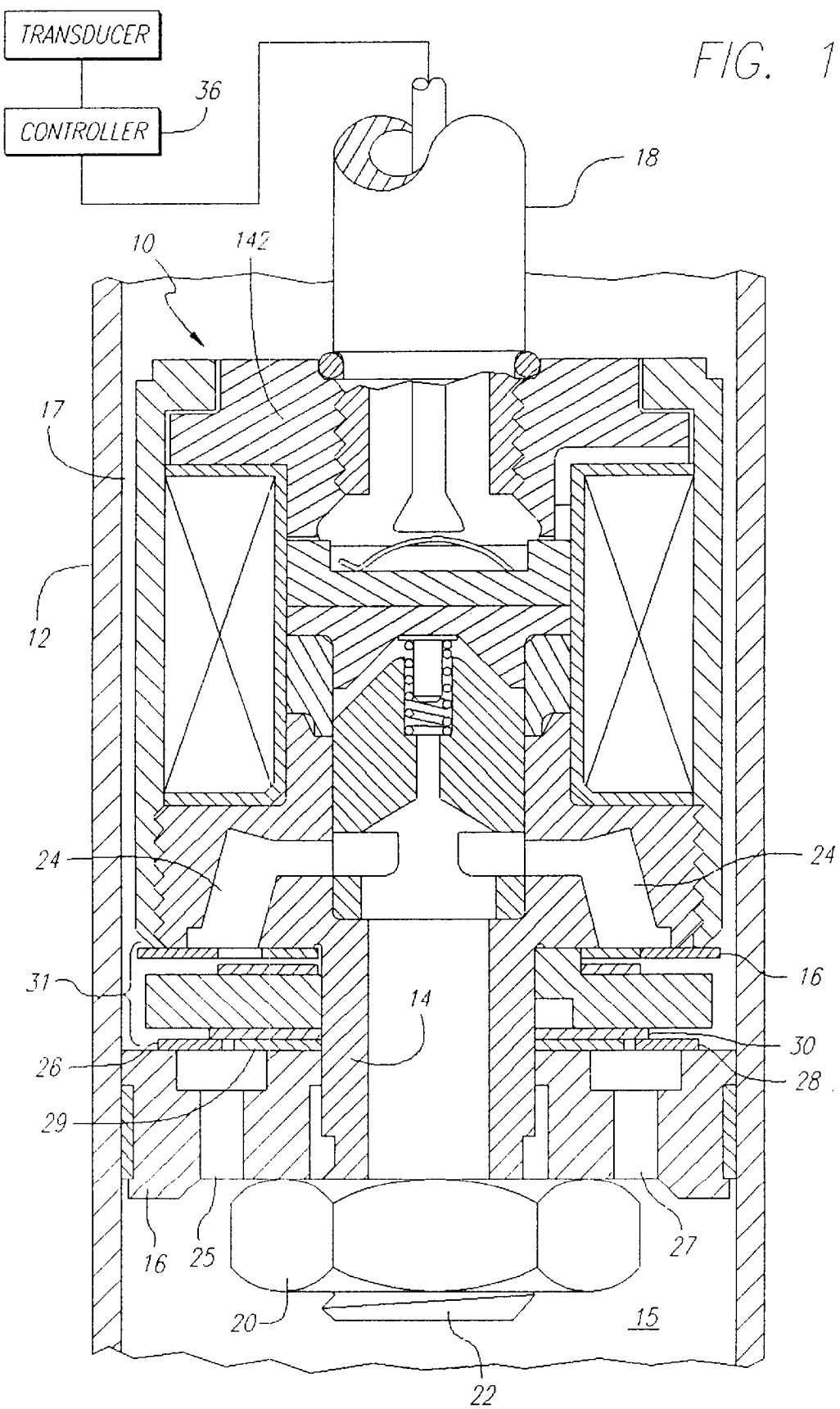
FIG. 1 is a cross-sectional view of part of a telescopic shock absorber incorporating a real time damper valve constructed according to the principles of the present invention.

As is illustrated in FIG. 1, a real time damper valve 10 constructed in accordance with the principles of the present invention is shown in FIG. 1 assembled as part of a typical shock absorber. This typical shock absorber includes a cylinder 12 having a piston 16 mounted on a piston rod 18 with the damper valve 10 interposed between the piston rod 18 and the piston 16.

In a typical automotive vehicle configuration, the vehicle body is supported by four wheels and by four suspensions including springs of known types. Each of the suspensions also include a shock absorber mounted in a conventional shock absorber configuration as above-generally described. Each corner of the vehicle would also include means such as a sensor or transducer for detecting linear position between the vehicle wheel and the suspended vehicle body at that corner of the vehicle. The sensor or transducer may be constructed utilizing any of the well known devices available in the industry capable of sensing such position or acceleration and providing an output signal. The output signals generated by the transducers are then used to control the damping valve which is mounted within the shock absorber. Such structures as generally described above are well known in the art. For example, as illustrated in U.S. Pat. No. 5,559,770 ('770) above-referenced which is incorporated by reference herein and therefore no further detailed description of the overall system is provided. What is illustrated and discussed hereafter in this application is the construction of the real time damper valve mounted as an integral part of each shock absorber at each corner of the vehicle.

As is shown in FIG. 1, the damper valve 10 is connected to the lower end of the piston rod 18. The damper valve includes a lower portion 14 upon which the piston 16 is mounted. The piston 16 is held in place by a retaining nut 20. The lower end 14 of the damper valve 10 defines a longitudinal opening 22 through which fluid disposed within the cylinder on each side of the piston may flow. When the piston is moving downwardly as viewed in FIG. 1, the fluid will pass from the chamber 15, past the washer 19 by deflecting it downwardly and into chamber 17. When the piston is moving upwardly as viewed in FIG. 1, the flow path reverses. Other type of passages or by passes through or around the piston 16 may be provided as desired. In accordance with the illustration of FIG. 1, the damper valve 10 is normally open thus providing a regulated flow of the fluid normally contained within the cylinder 12, chambers 15 or 17 on each side of the piston 16. Additional and bypass flow is provided through the piston 16 by the longitudinal openings 25 and 27 provided therein. The openings 25 and 27 are blocked by closure members 26 and 28 respectively. The closure members 26 and 28 are formed by a washer member 29 the outer portion of which is adapted to flex in response to pressure above a predetermined threshold. When the pressure in the chamber 15 exceeds the threshhold, the outer rim of the washer will deflect upwardly away from the top of the piston 16 allowing fluid to flow through the openings 25 and 27 into the chamber 17. When the pressure in chamber 17 exceeds the threshhold, the outer portion of the washer 29 will deflect downwardly away from the support member 30 allowing fluid to flow through the openings 25 and 27 into the chamber 15. As is well known to those skill in the art, as the piston 16 is caused to move upwardly as viewed in FIG. 1, the fluid pressure in chamber 17 may increase until the threshold is reached. Similarly, as the piston is moved downwardly, fluid pressure in the chamber 15 may increase until the threshhold is reached. It will be understood by those skilled in the art that relatively slow movement of the piston 16 within the cylinder 12 will allow fluid to flow in an unrestricted manner through the openings 22 and 24 thereby bypassing the openings 25 and 27 in the piston 16. However, upon very rapid movement of the piston within the cylinder 12 the area provided by the openings 22 and 24 will be insufficient to permit unrestricted flow of the fluid and a differential pressure will build across the piston 16 thereby bringing into play the flow through the openings 25 and 27 as above-described. Thus it is seen there are parallel flow paths for the fluid in the cylinder 12 on each side of the piston 16 depending upon the operating conditions encountered by the suspension on a particular corner of the vehicle.

Depending upon the operating conditions encountered by a particular corner of the vehicle, it may be desired to stiffen the shock absorber at a particular corner of the vehicle. This would be accomplished by utilizing the signal generated at that particular corner by the position sensor or transducer 34 associated therewith. The signal generated by the transducer would be applied to a controller 36 which traditionally would be a microprocessor which would function in accordance with a pre-determined algorithm to provide an output signal over the wire 32 which is positioned within an opening 30 in the piston rod 18 and is connected as will be described more fully below to electromagnetically energize the damper valve 10. When such occurs the openings 24 are closed thus permitting fluid to flow only through the openings 25 and 27 within the piston 16.

Figure 14:
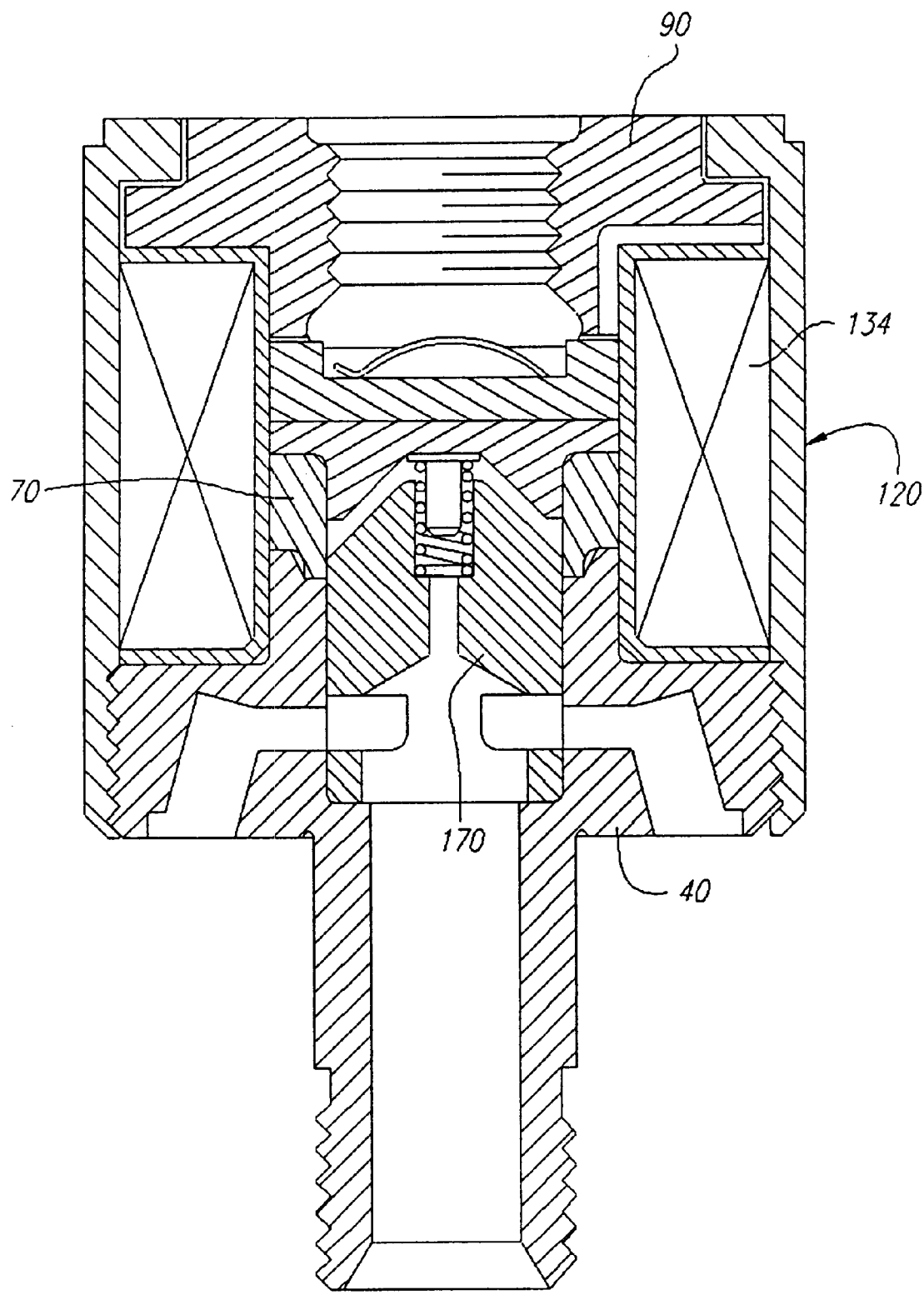
FIG. 14 is a cross-sectional of an assembled shock absorber mounted real time damper valve of the present invention.

Referring now, more particularly to FIGS. 2 through 9, there is illustrated the component parts of the valve which when assembled appear as illustrated in FIG. 14. As is illustrated in FIGS. 2 and 3 to which reference is hereby made the housing 40 defines a bore 42 extending longitudinally therethrough. There is also provided a re-entrant bore 48 defining an additional shoulder 50 is provided at the upper portion 52 of the housing 40. The housing 40 also includes an outwardly extending flange like member 54 which defines a plurality of openings such as illustrated at 56 and 58 extending from the lowered surface 60 therof upwardly and into the body of the flange 54. Transverse openings such as those seen at 62 and 64 communicated with the openings 56 and 58 (the outlet 24, FIG. 1) and terminate within the re-entrant bore 44. The transverse bores 62 and 64 define flow ports for fluid entering the opening 22 as above described. Those flow ports are closed by the operation of the valve as will be described more fully below. The outer surface of the flange 54 is threaded as illustrated at 55 and threadable receives a cap 120 (FIG. 8) as will be described more in detail below. The housing 40 also includes a lower portion 66 terminating in a threaded distal end 68 upon which the nut 20 is secured.

Figure 4:
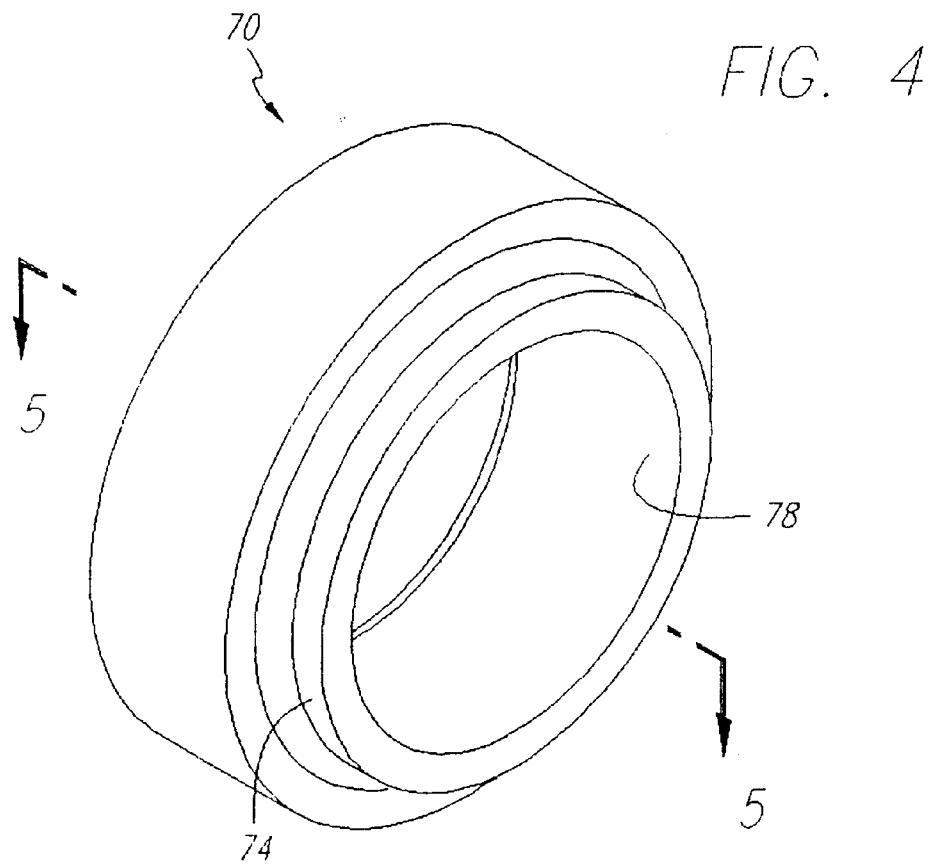
FIG. 4 is a perspective view of a spacer used in the valve of the present invention.
Figure 5:
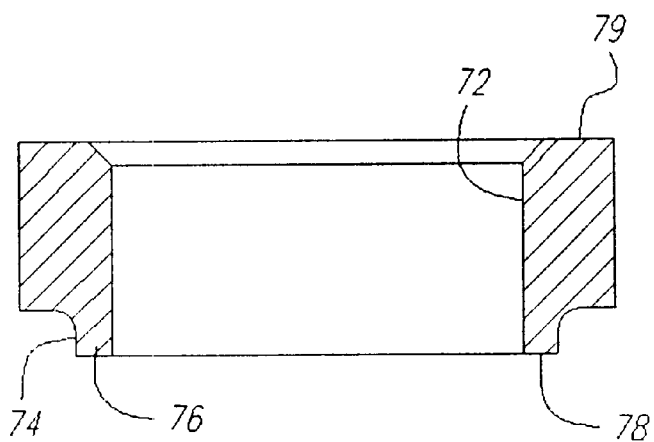
FIG. 5 is a cross-sectional view of the spacer taken about the lines 5—5 of FIG. 4.

As shown in FIGS. 4 and 5, the components include a spacer member 70 which preferably is constructed of non-magnetic material. The spacer member includes a bore 72 therethrough which conforms to the re-entrant bore 44 in the housing 40 insofar as internal diameter is concerned. The spacer 70 includes a reduced outer diameter area 74 which effectively defines a downwardly directed rim 76. The rim 76 fits within the second re-entrant bore 48 of the housing 40 and the lower surface 78 therof abutts the shoulder 50.

As shown in FIG. 2, the housing member 40 has been machined to provide a key way 72 which receives a key (not shown) which is defined by the piston 16 to hold the piston in position and to prevent it from rotating upon the housing member 40. Prior to placing the piston 16 in place, the closure member assembly 31 would be placed over the lower portion of the housing member so that its abuts the lower portion 60. Subsequently, the piston is positioned and the nut 20 is secured in place upon the threads 68 which are formed at the bottom of the housing member 40.

Figure 6:
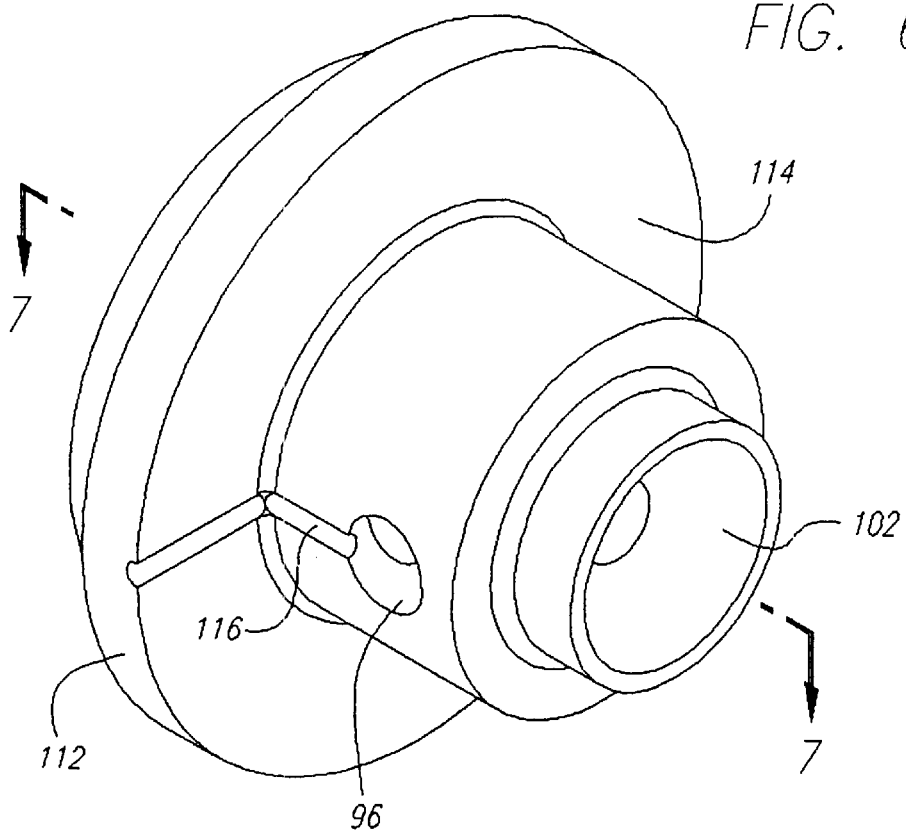
FIG. 6 is a perspective view of a center pole used in the valve of the present invention.
Figure 7:
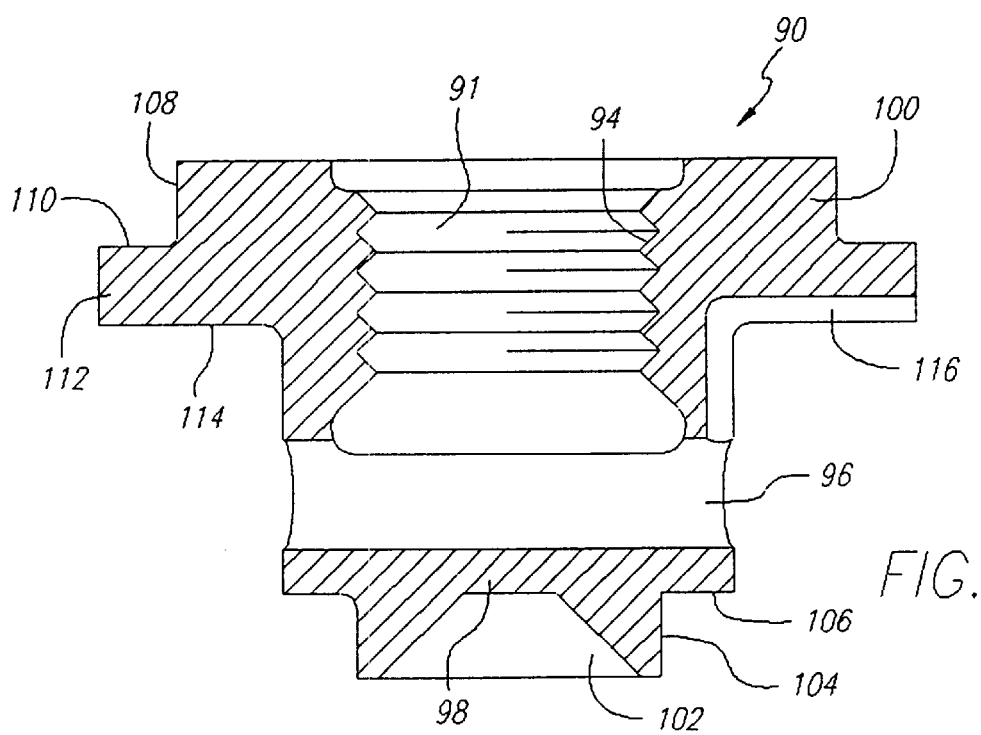
FIG. 7 is a cross-sectional view of the center pole taken about the lines 7—7 of FIG. 6.

As is more particularly shown in FIG. 6 and FIG. 7, the center pole member 90 has a bore 91 formed therein, the interior of which is threaded as shown at 94 to receive the piston rod 18. An opening 96 is formed transversely to the longitudinal axis through the center pole member and receives a contact assembly as will be more fully described below in conjunction with FIGS. 10 through 12.

The bore 91 formed in the center pole member 90 terminates in a blind fashion leaving a lower wall 98 which blocks the flow of fluid causing it to flow through the openings 62–64 of the housing 40.

The body 100 of the center pole member 90 terminates at the lower end in a concave depression 102 which receives the upper portion of the spool as will be described herein below. The lower portion also has a reduced diameter area 104 which defines a shoulder 106. The reduced diameter portion 104 is received within the bore 72 of the spacer 70 with the upper edge or surface 79 of the spacer abutting the shoulder 106. The upper portion of the body 100 also includes a reduced diameter portion 108 which defines a shoulder 10 on a flange 112 which laterally extends from the body 100. As will be described more fully below, the lower surface 114 of the flange 112 abuts the bobbin upon which the coil is wound. A groove 116 is provided on the outer surface of the body 100 through which an electrical lead may be passed for establishing electrical communication to the positive terminal of the coil. Under certain configurations of the valve, the groove 116 may be eliminated.

Figure 8:
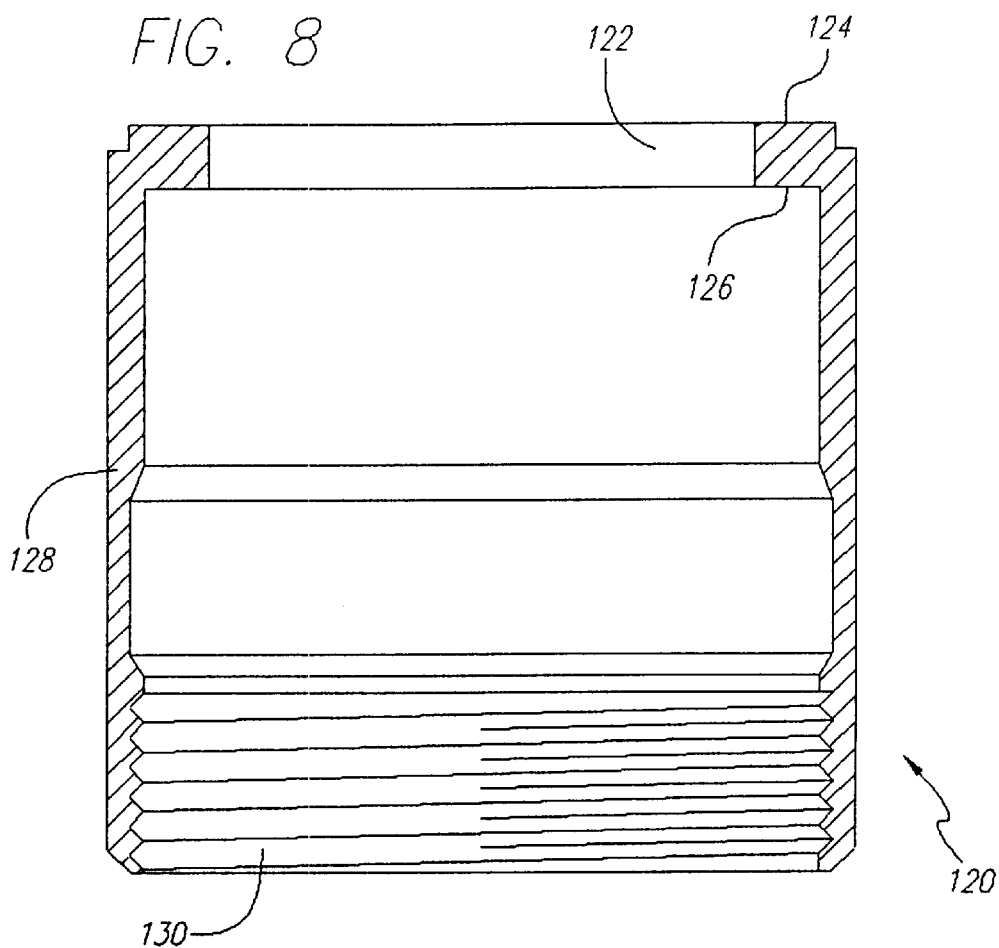
FIG. 8 is a cross-sectional view of a jacket used as part of the valve of the present invention.

By reference now to FIG. 8, there is illustrated a cap 120. The function of the cap is to secure all of the component parts of the valve together and to hold them in the assembled position without additional securing devices such as being brazed together, adhesively secured or the like. Thus, the cap 120 eliminates fasteners and fastening structures which have been utilized in the prior art. The cap 120 defines an opening 122 through the upper wall 124 thereof. The opening 122 receives the reduced diameter portion 108 of the center pole piece as shown in FIG. 7. The upper wall also defines an inwardly directed lip 126 which abuts the surface 110 on the outwardly directed flange 112 of the center pole piece. The lower portion of the wall 128 of the cap 120 has internal threads 130 formed therein. The internal threads 130 threadably meet with the threads 55 appearing on the housing 40. Once these parts are assembled by threadably engaging the threads 130 with the threads 54 and tightening the cap 120 onto the housing 40 all of the component parts are secured together.

Figure 9:
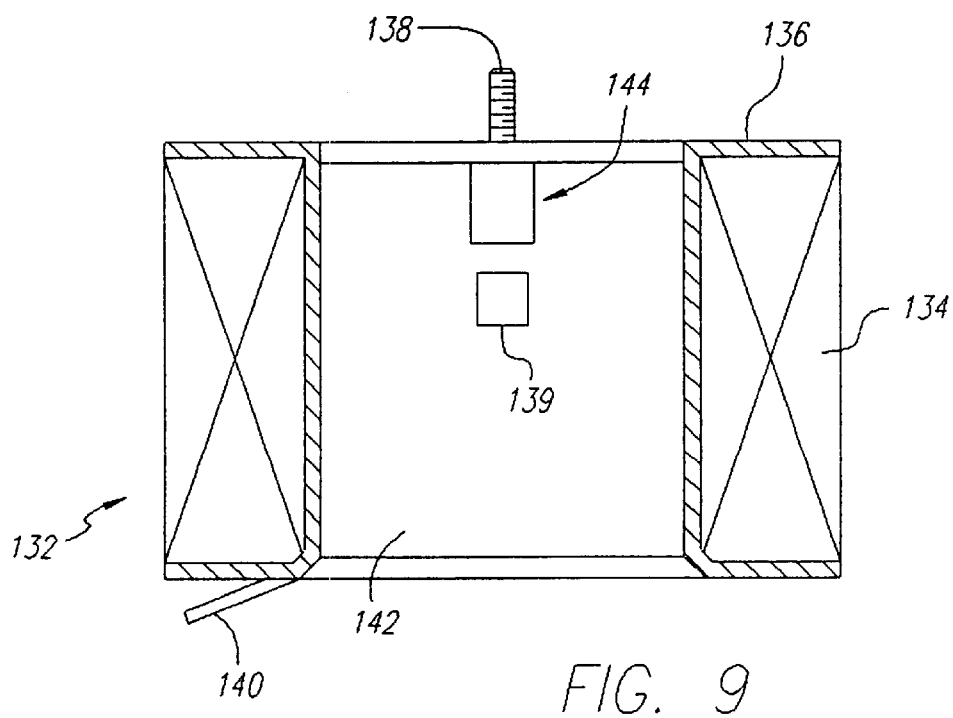
FIG. 9 is a partial cross-sectional view of a coil assembly used as part of the valve of the present invention showing the electrical contact as assembled with the coil as used in the valve of the present invention.

As is illustrated in FIG. 9, the opening 142 in the bobbin 136 is utilized for placing the bobbin into position upon the upper surface of the flange 54 and to receive the lower portion of the body 100 of the center pole piece 90 as is shown in FIG. 7. In utilizing a construction as is illustrated in FIG. 9 the negative contact 138 would be connected to an electrical lead which would be channeled through the groove 116 to the contact as shown at 32 in FIG. 1. The positive terminal for the coil is shown at 139. A redundant negative contact or ground connection 140 would contact the upper surface of the flange 54 to assist to complete the electrical circuit for the coil 134. An appropriate depression would be formed in the flange 112 of the center pole piece to receive the electrical contact 138. An antirotation tab 144 is used to prevent rotation of the coil structure 134 during assembly of the valve.

By reference to FIGS. 10, 11 and 12, there is illustrated the contact assembly which provides electrical connection between the controller and the negative terminal 138 of the coil 134. As is therein shown, there is provided abase 152 constructed of insulating material such for example as an appropriate molded plastic member. One end of the base is provided with a non-circular configuration 154 which may be inserted into the opening 96 and into engagement with flat portions thereof to preclude the base member 152 from rotation. Received within the base member is an electrical contact 156 which is in the form of a leaf spring-type configuration having a termination 158 in the form of a curved member to allow movement thereof along the bottom 160 of the base member when force is applied to the upper surface of the contact 156 by the end of piston rod 18 being screwed in place through utilization of threads 94. The bottom of the piston rod 18 has a center contact to which the wire 32 is connected and through which control signals from the controller 36 pass. The control signals are then conveyed through the electrical contact 156 and the end thereof shown at 162 which contacts the positive contact 139 on the coil. It will now be realized that the contact assembly as shown in FIGS. 10, 11 and 12 would be (upon assembly of the valve) inserted through the opening 96 provided in the center pole 90. The opening 96 provided in the center pole provides the flats which would cooperate with the non-round configuration of the protrusion 154 on the base 152 to prevent the contact assembly from rotating. Since the end 162 of the electrical contact protrudes into the groove 116, it is contacted by an electrical lead leading to the positive contact 139 on the coil.

As shown in FIG. 13, there is provided a spool 170 which is positioned within the housing and which is moveable between first and second positions depending upon whether an electrical signal is applied to the coil 134 of the valve. The spool includes a body 172 defining a bore 174 from the lower end 176 thereof. Slots 178 and 180 are provided on each side of the body 172 to provide a flow path as will be described below. The body 172 also defines an additional bore 182 at the opposite end from the bore 174. A reentrant bore 184 is also provided to permit fluid flow through the spool 170. A spring 186 is seated within the bore 182 and a shim 188 formed of a nonmagnetic material is received within the spring 186. The shim 188 includes a shim body 190 with a cap 192 there across. The lower end of the body 190 is tapered as shown at 194 to provide easy insertion of the shim into the end opening of spring 186. The reentrant bore 184 defines a skirt 196 on the spool 170. The lower end 176 of the body 172 rests upon the shoulder 46 in the housing 40 (FIG. 3).

The damping valve fully constructed but before assembly upon the piston as shown in FIG. 1 is illustrated in cross-section in FIG. 14. The housing 40 as described above is provided. Thereafter, the spool 170 as shown in FIG. 13 is positioned on the shoulder 46 with the spring and shim in place. The spacer 70 is positioned on the shoulder 50 and the coil assembly 132 is placed upon the top of the flange 54. The contact base 152 with the contact in place is inserted into the center pole 90 and it is then positioned on the spacer and coil assembly. Thereafter, the cap 120 is positioned over the entire assembly and is threaded onto the flange 54 and tightened to secure the components together. The cap is the only means for securing the components in place.

The shim 188 provides a non-magnetic material between the top portion of the spool and the lower portion 98 of the center pole member to thereby provide a permanent air gap and prevent the spool from being retained by magnetic forces against the bottom of the center pole piece in the absence of a signal being applied to the coil 134.

It will now be appreciated that after assembly of the electromagnetically operated damper valve as above described, it may be used with the assembly of shock absorbers placed in vehicles by threading the piston rod 18 into the threads 94 and by placing the piston 16 upon the lower portion of the housing member as above described and retaining it in place with the nut 20. Alternatively, any shock absorber may be retrofitted in a similar manner after a system has been installed in the vehicle to utilize an appropriate transducer and controller as above discussed.

Through the utilization of the electromagnetically operated damper valve constructed in accordance with the principles of the present invention, when an event occurs which according to the program in the controller will provide an undesirable event for the user of the vehicle, a signal may be applied to the coil energizing it and completing the magnetic circuit which will cause the spool to move from the position shown which is the normally open position to its second position which is against the member 98 of the center pole member thereby closing the openings 62-64 and preventing fluid from flowing through the opening 22 and out the opening 24 of FIG. 1. Under these circumstances, total damping is accomplished by the flow of the hydraulic fluid from one side to the other of the piston 16 through the openings 25 and 27 as above described. Under these circumstances a much firmer shock absorber is provided. When the undesired event has passed, the signal is removed from the coil and the spool is returned to the position as shown which allows fluid to freely flow through the bypass openings 22, 24 as above described.

What is claimed is:

1. A real time damper valve for use with an automotive vehicle shock absorber having a piston and a piston rod, said damper valve comprising:

(a) a lower housing defining a centrally disposed longitudinal bore extending therethrough and having an outwardly directed flange like body portion, said body portion defining a plurality of fluid flow paths communicating with said longitudinal bore and an outer threaded surface;

(b) a valve spool seated within said longitudinal bore and disposed for reciprocal movement between first and second positions, said valve spool closing said flow paths in one of said first and second positions and opening said flow paths in the other of said first and second positions;

(c) means for continuously urging said spool valve toward said other of said first and second positions;

(d) electromagnetic means for moving said spool valve from said other of said first and second positions to said one of said first and second positions upon the application of an electrical signal thereto said electromagnetic means including a coil wound on a bobbin having an inner surface defining a groove, an electrically conductive member disposed within said groove and connected to said coil, and a center pole having a longitudinally disposed re-entrant bore and a transverse bore communicating therewith, a contact means disposed within said transverse bore and electrically contacting said conductive member, and (e) a jacket having an inwardly directed lip and a downwardly depending skirt, said skirt having threads at its terminus for engaging said outer threaded surface on said flange like body portion of said lower housing to sandwich said valve spool and said electromagnetic means between said lip and said flange like body portion and being the only means for securing said valve spool, means for continuously urging and said electromagnetic means within said housing.

2. A real time damper valve as defined in claim 1 wherein said contact means and conductive member provide a positive electrical connection to said coil and a negative electrical connection is provided by connecting said coil and said valve housing.

* * * * *